June 7, 1960 H. L. THAL, JR 2,940,007

MAGNETRON CIRCUITS

Filed Jan. 20, 1958 3 Sheets-Sheet 1

INVENTOR:
HERBERT L. THAL, JR.

BY Nathan J. Cornfeld

HIS ATTORNEY.

June 7, 1960 H. L. THAL, JR 2,940,007

MAGNETRON CIRCUITS

Filed Jan. 20, 1958 3 Sheets-Sheet 2

INVENTOR:
HERBERT L. THAL, JR.

BY Nathan Kornfeld
HIS ATTORNEY.

INVENTOR:
HERBERT L. THAL, JR.
BY Nathan J. Cornfeld
HIS ATTORNEY.

United States Patent Office 2,940,007
Patented June 7, 1960

2,940,007

MAGNETRON CIRCUITS

Herbert L. Thal, Jr., Schenectady, N.Y., assignor to General Electric Company, a corporation of New York Filed Jan. 20, 1958, Ser. No. 710,012

7 Claims. (Cl. 315—39.55)

My invention relates to circuit arrangements for magnetron devices and pertains more particularly to new and improved circuit means for effecting output loading of interdigital magnetrons such as voltage tunable magnetrons.

In U.S. Patent No. 2,810,096 entitled, "Voltage Tunable Magnetron With Control Electrode," patented October 15, 1957, to P. H. Peters, Jr., and D. A. Wilbur and assigned to the same assignee as this application, is disclosed and claimed an interdigital magnetron device adapted for being controlled by selectively varying the anode voltage to vary linearly the frequency of oscillation and similarly varying a control electrode voltage to adjust the output power level. In order to effect output loading or to obtain power from an interdigital magnetron of the type disclosed in the above-mentioned patent it is necessary to present a real radio-frequency impedance between a pair of anode rings, which rings characteristically support and afford electrical connections to the electrodes comprising the interdigital arrangement in the magnetron. The value of this impedance determines the power output of the magnetron and, in the case of voltage tunable magnetron, also determines the band width of operation.

Additionally, it is often desirable to make electrical connection between the magnetron and load by means of a coaxial conductor. Also, in such circuitry it is often desirable to provide between the magnetron anode rings and coaxial conductor a transitional connection which will afford physical support for the magnetron, minimize radio frequency field discontinuities between components with resultant minimum undesired reflections, and provide a predetermined characteristic impedance in the transitional connection, thus to determine the power output and operational bandwidth of the magnetron. Still further, it is often desirable to provide circuitry that has no low frequency limit.

Accordingly, a primary object of the present invention is to provide new and improved magnetron circuitry including transitional means adapted for affording a high degree of field continuity between a magnetron and a coaxial conductor and presenting a predetermined radio frequency impedance between the anode rings of the magnetron.

Another object of the present invention is to provide interdigital magnetron circuitry which is versatile in that by simple variations of critical dimensions it can be readily adapted for providing a wide range of impedances between the anode rings of the magnetron, thereby to provide a wide range of magnetron operating characteristics.

Another object of the present invention is to provide voltage tunable magnetron circuitry adapted for enabling voltage tunable magnetron operation over a substantially broad band of frequencies having essentially no low frequency limit.

Another object of the present invention is to provide interdigital magnetron circuitry which can be made physically small even at low fraquencies.

Another object of the present invention is to provide voltage tunable magnetron circuitry including means adapted for selectively resonating such circuitry at different predetermined desired center frequencies, thereby to enable voltage tuning of frequency within bandwidths including such center frequencies.

Another object of the present invention is to provide interdigital magnetron circuitry particularly adapted for doubly loading an interdigital magnetron, or providing loads on diametrically opposite sides of the magnetron, to obtain a desired impedance transformation and load isolation.

Another object of the present invention is to provide interdigital magnetron circuitry including transitional means which can be simply and quickly designed and constructed and so as to yield predictable and satisfactory results.

Another object of the present invention is to provide a simply and inexpensively manufacturable interdigital magnetron circuit which effectively mechanically supports an interdigital magnetron and effects retention of the magnetron in a supported position without resort to special retaining means.

Further objects and advantages of my invention will become apparent as the following description proceeds and the features of novelty which characterize my invention will be pointed out with particularity in the claims annexed to and forming part of this specification.

In carrying out the objects of my invention, I provide voltage tunable magnetron circuitry including a coaxial conductor, a line-over-ground plane circuit between the coaxial conducor and the anode rings of an interdigital voltage tunable magnetron. The line-over-ground plane circuit comprises a pair of parallel closely spaced conductors adapted to receive and make circumferential electrical contact with the closely spaced anode rings of the magnetron and to support the magnetron mechanically. The transitional region of the circuit between the magnetron and coaxial conductor is constructed to provide a predetermined characteristic impedance relative to the characteristic impedance of the coaxial conductor and depending upon whether broad band or narrow band operation is desired. On the side of the circuit opposite the coaxial conductor an inductance is provided between the anode rings of the magnetron which is adaptable for serving as means for varying the inductance between the anode rings or as a radio frequency choke. Double transitions disposed on opposite sides of the magnetron can be used with one going to a useful load and the other to a dummy or non-operative load to provide isolation between the magneton and load as well as desired impedance transformation. The magnetron is supported and retained in the circuit solely by disposition of the anode rings in opposed counterbored recesses in the opposite inner faces of the parallel conductors comprising the line-over-ground plane circuit.

For a better understanding of my invention reference may be had to the accompanying drawing in which.

Figure 1:
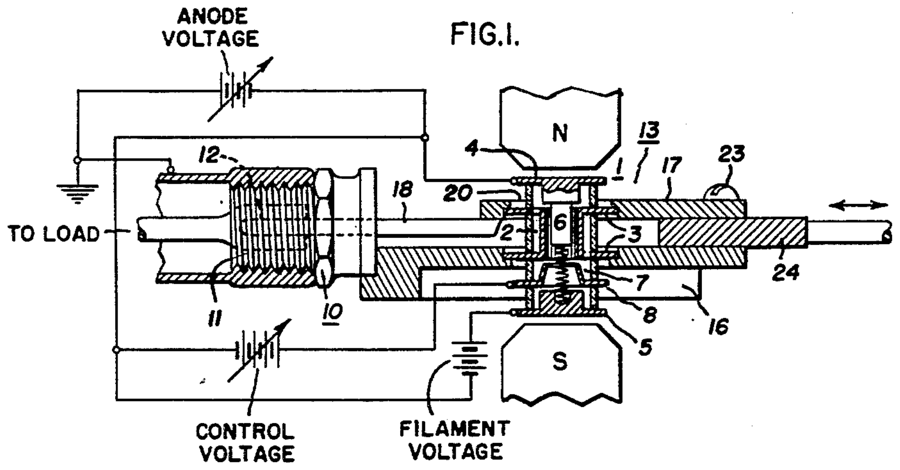
Figure 1 is a somewhat schematic illustration of voltage tunable magnetron circuitry incorporating an embodiment of a broad band form of my circuit arrangement.

Referring to Figure 1, there is shown voltage tunable magnetron circuitry adapted for operation with a voltage tunable magnetron 1 which can be of the type disclosed and claimed in the above-noted Patent No. 2,810,096. Briefly, this type of magnetron comprises an evacuated envelope containing an interdigital arrangement of anode electrodes 2, supported by and electrically connected to a pair of spaced anode rings or contacts 3. Metal caps 4 and 5 close the ends of the envelope and serve as contacts for completing an electrical circuit through longitudinally spaced emissive and non-emissive portions of a cathode arrangement 6. A metal ring or control contact 7 disposed between the cap 5 and the adjacent one of the anode rings 3 serves for making electrical contact to a control electrode 8 whereby electrons originating at the emissive portion of the cathode are injected into the interaction space between the non-emissive portion of the cathode and interdigital anode arrangement. Suitable insulation of contacts is provided by cylindrical insulators disposed therebetween and comprising part of the envelope wall.

The magnetron 1 is adapted for operation in conjunction with a static axial magnetic field of the order preferably of approximately 2500 gauss. This magnetic field can be produced by any suitable permanent magnet or electromagnet including, for example, a pair of opposed pole pieces designated N and S disposed adjacent the end caps 4 and 5 (longitudinal ends) of the magnetron 1 and substantially accurately coaxially aligned with the magnetron. A filament voltage supply is provided for energizing the emissive portion of the cathode. An adjustable control voltage supply is provided for selectively determining the control electrode voltage, thereby to determine the amount of electrons injected into the interaction space. An adjustable anode voltage supply is provided for determining the operating frequency of the magnetron. Thus, as brought out in detail in Patent No. 2,810,096, the output power level of the magnetron can be predeterminedly varied by adjusting the control voltage, and the frequency of oscillation can be linearly varied by adjusting the anode voltage.

As pointed out above, in order to obtain power from an interdigital magnetron 1 it is necessary to present a real radio frequency impedance between the two anode rings 3; and the value of this impedance determines the output power of the tube and, in the case of voltage tunable magnetrons, the impedance also determines the frequency band width of operation.

Figure 2:
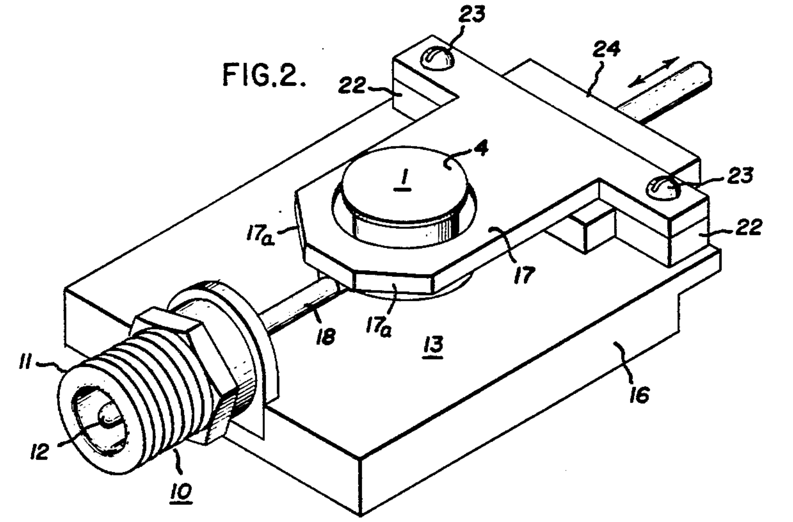
Figure 2 is an enlarged perspective view of the broad band form of my arrangement.

Illustrated in Figures 1 and 2 is a broad band voltage tunable magnetron circuit arrangement including the magnetron 1, a coaxial conductor which can be a coaxial cable comprising a connector or terminal 10 including a threaded tubular outer conductor 11 and a concentric center conductor 12, the cable being adapted for connecting the magnetron with a load, and a line-over-ground-plane circuit generally designated 13 interposed between the magnetron and coaxial conductor.

From the onset, it is to be understood that the term "line-over-ground-plane" as used herein means the disclosed circuit arrangements including the spaced parallel conductors providing electrical connections between the anode rings and coaxial cable, and this term is not to be considered limited or used with specific reference to any specific elements making up the spaced parallel conductors.

Electrically, the circuit 13 can be considered as consisiting of two functional regions, an electrical transitional region which supports the magnetron in the circuit and lies between the magnetron 1 and the coaxial terminal 10, and another region which is disposed on the diametrically opposite side of the magnetron and serves as an inductance in the circuit.

Structurally the circuit 13 comprises a pair of closely spaced parallel lower and upper conductors. The lower conductor comprises the ground-plane and a plate or strip-like element 16 suitably and fixedly electrically connected, as by brazing, to one side of the outer conductor 11 of the coaxial terminal 10. The upper conductor constitutes the line and comprises a plate or strip-like element 17 and a rod-like element 18 which is an extension of the central conductor of the coaxial terminal and extends to and is fixedly electrically connected, as by brazing also, to the underside of the tapered end of the element 17. The element 17 is narrower than the strip 16 and terminates with a tapered configuration in the transitional region. In Figure 2 the taper is obtained by cutting off the corners of the element 17, as at *17a*. This taper can, however, be greater or less than shown, as required. For example, if desired the rod-like element 18 can be disposed of and the element 17 can be lengthened and tapered such that a pointed end thereof can be brazed directly to the inner conductor 12 of the terminal 10. The elements 16 and 17 are formed with registering apertures 20 having bore portions slightly smaller in size than the anode rings 3. The spacing between the elements 16 and 17 corresponds generally to the spacing between the anode rings 3. The apertures 20 are counterbored at the opposed innner surfaces of the strips to receive the anode rings 3 and, thus, when the elements 16 and 17 are held in spaced relation in the manner shown in Figures 1 and 2, the magnetron 1 is firmly supported and retained in the circuit with each of the spaced parallel conductors making highly conductive circumferential contact with the respective anode rings 2 of the magnetron.

Thus, the transitional region of the circuit provides for mechanical support of the magnetron with respect to the coaxial terminal through which output loading is to be effected. Additionally, and due to the circumferential contact of the elements 16 and 17 with the anode rings 3 and the tapered configuration of the element 17, an electrical transition is effected between the magnetron and coaxial terminal with satisfactory continuous radio frequency fields between the magnetron and circuit 13 and between the circuit 13 and the terminal 10 for minimizing undesired radio frequency reflections in the circuit.

By altering the various dimensions of the just-described circuit it is possible to obtain a wide range of impedances between the anode rings and, thus, a wide range of tube operating characteristics. For example, the properties of the electrical transitional region can be varied by changing the lengths of the elements comprising that region, and by changing the characteristic impedance of the transitional region, as by varying the configuration and spacing of the spaced parallel conductors.

By way of particular example, by predeterminedly shaping and spacing the portions of the elements in the transitional region of the circuit, the characteristic impedance of that region can, if desired, be made to match the characteristic impedance of the coaxial line to be connected to the terminal 10. Thus, it is possible to obtain a predetermined power output over a predetermined substantially wide frequency bandwidth. In this type of circuit the axial length of the transitional region is relatively unimportant. It can be substantially less than a quarter of the wavelength of the center frequency of a desired operating band; but, of course, in practice there is a limit beyond which this region may not be shortened without undesirably affecting operation of the magnetron. Also, in determining the characteristic impedance of the transitional region an important parameter is the ratio between the width of the upper conductor, constituting the line, and the spacing between that conductor, and the lower conductor, constituting the ground plane.

By way of further particular example, if it is desired to obtain greater power output with the presently disclosed circuits the characteristic impedance of the transitional region can, by altering the dimensions and shapes of the elements, be made uniform over the length of the transition region and greater than the coaxial line impedance and the length of the transitional region can be made equal to a quarter wave length of the center frequency of a predetermined desired operating band. Thus, the impedance presented between the anode rings will be increased resulting in increased power output. However, this power output increase will generally be at the expense of bandwidth.

Also for the purpose of increased power output, the characteristic impedance of the transitional region can be made greater than the coaxial line impedance and the length of the transitional region can be made less than a quarter wave length. Finally, for the same purpose, the impedance of the transitional region can be made non-uniform over the length thereof. As pointed out above, however, increase impedance at the magnetron affects the operating frequency.

Thus, it will be seen from the foregoing that by altering the various dimensions of and spacings between the elements constituting the transitional region and, specifically, by varying the length and characteristic impedance of this region, it is possible to obtain various predetermined impedances at the magnetron and thereby obtain various predetermined power versus frequencies relations.

It will be further seen from the foregoing that the line-over-ground plane circuit illustrated in Figures 1 and 2 is highly flexible or versatile and readily adaptable for being modified in shape or spacing of elements and, thus, is readily adaptable for being designed in a predictable manner for presenting a predetermined desired impedance between the anode rings of a voltage tunable magnetron, thereby to obtain predetermined desired power and frequency characteristics in the operation thereof.

The portions of the elements 16 and 17 comprising the functional region opposite the transitional region are secured together in fixed parallel relation by a pair of spacers 22 (Figure 2) which can be held in laterally spaced relation between the elements 16 and 17 by machine screws 23 or any suitable means. This region of the circuit constitutes an inductance or short-circuited section of transmission line connected between the anode rings. This inductance can include a slideable stub 24 and can be used to vary adjustably the inductance between the anode rings, thereby selectively to resonate the circuit at predetermined desired frequencies or it can be effectively utilized as a radio frequency choke. In the latter case, the inductance provides a direct-current short between the anode vanes, which is required for operation of the tube, but appears as an open circuit at microwave frequencies. If the load which is connected at the remote end of the coaxial line appears as a direct-current short, a radio frequency choke would be unnecessary and the inductive stub could be omitted from the line-over-ground-plane circuit 13, unless, of course, it is desired to utilize same as means for adjustably varying the inductance for resonating the circuit at different preselected center frequencies.

A broad band circuit has been constructed according to the form of my invention as shown in Figures 1 and 2 for connecting a voltage tunable magnetron with a 50 ohm coaxial cable and with a transitional region having the same characteristic impedance as the coaxial cable. The circuit was designed for the nominal frequency range of from 2,000 to 3,000 megacycles per second and the resultant output power was found to be in excess of 2 watts over the entire frequency range with an average efficiency of approximately 15 percent.

Figure 3:
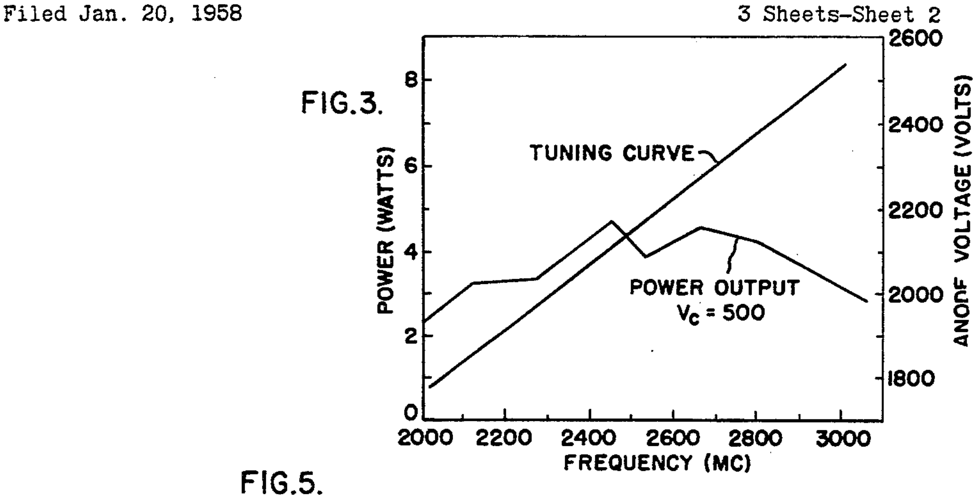
Figure 3 is a curve illustrating data obtained in the operation of the circuit of Figures 1 and 2.

The curve shown in Figure 3 illustrates the power output obtainable from a voltage tunable magnetron with the just-described broad band circuit and with the control voltage of the magnetron adjusted to a value of 500 volts and the anode voltage swept through a range of from approximately 1750 volts to approximately 2550 volts. Thus, it will be seen that with circuitry of the type shown in Figures 1 and 2, there is obtainable a substantially uniform power output of approximately 2 to 4 watts over a substantially broad band of frequencies.

Figure 4:
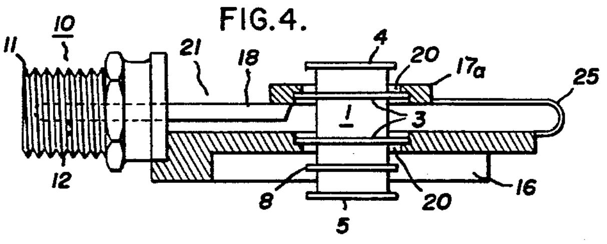
Figure 4 is an enlarged sectional view of a modified form of my circuit arrangement.
Figure 5:
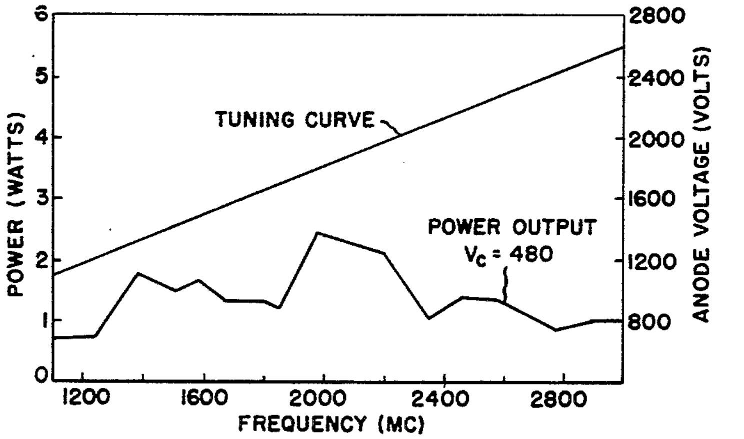
Figure 5 is a curve illustrating data obtained in the operation of the circuit of Figure 4.

The curve of Figure 5 illustrates the power output obtainable from the voltage tunable magnetron 1 with the above-described broad band circuit modified in the manner illustrated in Figure 4 for untuned operation and with the magnetron 1 connected to the filament, anode, and control voltage supplies of Figure 1. In this arrangement the upper element **17*a* comprises a flat metal annulus or ring-like conductive element rather than a metal strip and a radio frequency choke, consisting of a loop of fine wire 25 is connected between the inductance portions of the strip 16 and the annulus 17*a* in the manner illustrated in Figure 4 in order to maintain the anode rings of the magnetron 1** at the same direct current potential. In the untuned operation the circuit is adapted to resonate substantially below the desired operating frequency.

As seen in Figure 5, the output power obtained with the just-described untuned circuit, when the control voltage was adjusted to a value of 480 volts and the anode voltage swept through a range from approximately 1100 volts to approximately 2600 volts, was greater than 750 milliwatts from 1100 to 3000 megacycles per second. The efficiency dropped to a few percent at the high end of the frequency band due to the fact that the magnitude of the load impedance, which includes the cold tube capacity, decreased and its phase angle became more reactive as frequency increased. It will be noted that the power was substantially the same at the extremes of the frequency band even though the real part of the impedance was four times larger at the lower end of the band. Thus, the circuit of Figure 4 is effective for compensating for changes in operation of the magnetron and the magnetron and circuit in combination operate to provide a substantially uniform power output over a substantially broad frequency band.

Figure 6:
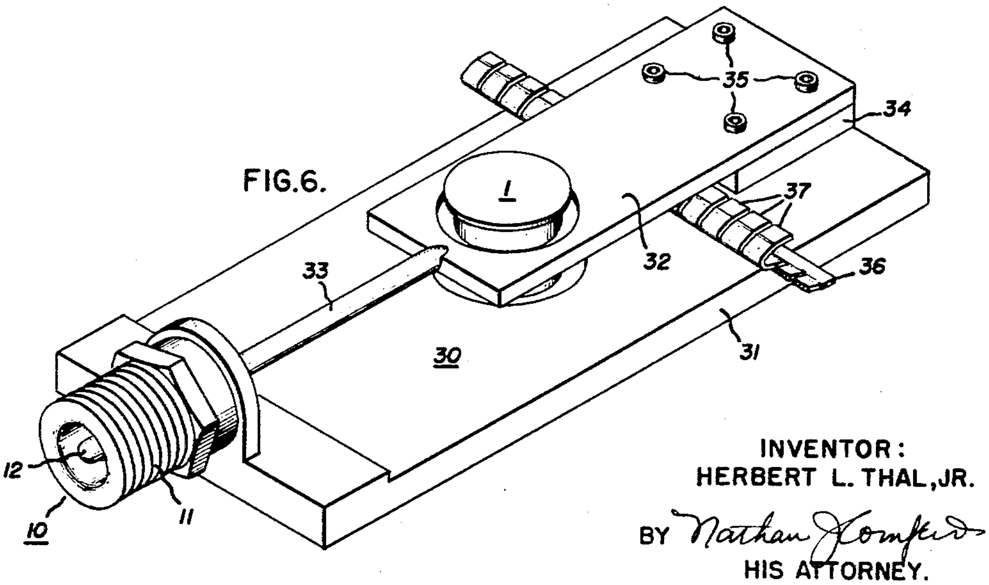
Figure 6 is an enlarged perspective illustration of a narrow band form of my circuit arrangement.

Illustrated in Figure 6 is a narrow band transitional circuit generally designated 30. This circuit is adapted for receiving and supporting a voltage tunable magnetron 1 in the same manner as the broad band transitional circuit shown in Figures 1, 2, and 4. Additionally, in this circuit the magnetron 1 is adapted for connection to the various voltage supplies in the same manner as in Figure 1.

In the arrangement of Figure 6 the lower and upper elements 31 and 32, respectively, are suitably fixedly connected electrically, as by brazing, to the outer conductor 11 and a rod-like extension 33 of the inner conductor 12 of the coaxial terminal 10. The narrow band properties are obtained by shaping, spacing, and dimensioning the just-described elements so as to provide a transitional region between the magnetron and the coaxial line terminal 10 which is a quarter wave length at the center frequency of the desired operating band and the characteristic impedance of which is greater than the characteristic impedance of the coaxial line. In this circuit the transition from the square end of the element 32 to the rod-like element 33 would appear undesirably disruptive. However, this configuration adds only a relatively small amount of capacity as compared with the relatively higher capacity of the magnetron and, thus, this added capacity can be tolerated and the element 32 need not be tapered to minimize capacity.

The inductive portion of the circuit of Figure 6 includes a spacer 34 disposed between and adapted for maintaining the desired parallel spaced relation between the elements 31 and 32. Suitable fastening means such as machine screws 35 are provided for holding the spacer and elements in fixed relation. Also included in the inductive portion is a slideable electrically-conductive shortening element 36 which, as illustrated, can comprise a metallic strip of bent spring fingers 37. The slideable element 36 is adapted through adjustive movements thereof for mechanically varying the inductance between the anode rings and, thus, selectively resonating the circuit at predetermined desired center frequencies of the narrow band over approximately a 2 to 1 range. Linear frequency tuning on either side of such center frequency is thereafter obtained by the above-discussed voltage tuning of the magnetron.

A narrow band circuit has been constructed according to Figure 6 and the foregoing description thereof for connecting a voltage tunable magnetron with a 50 ohm coaxial cable. The circuit 30 was constructed with a transitional region having a characteristic impedance of approximately 120 ohms. This yielded a transformed load impedance at the tube of 288 ohms at the frequency for which the length of the transition region is one quarter wavelength. At two-thirds or four-thirds of this quarter wave frequency, the real part of the transformed load was 232 ohms. It was found that the reactance introduced may be neglected when combined with the reactance of the tube. Thus, the equivalent circuit of this device over a 2 to 1 frequency range was approximately a resonant circuit composed of the magnetron capacity, the inductance of the stub or inductance region and a resistance of approximately 260 ohms in parallel each with the other two.

Figure 7:
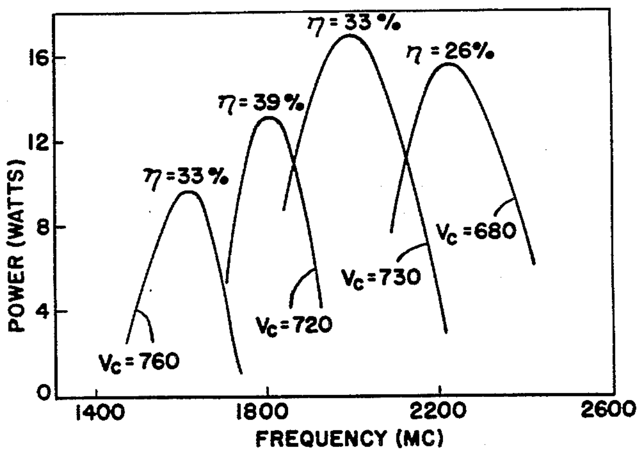
Figure 7 illustrates the power spectra of the narrow band circuit of Figure 6.
Figure 8:
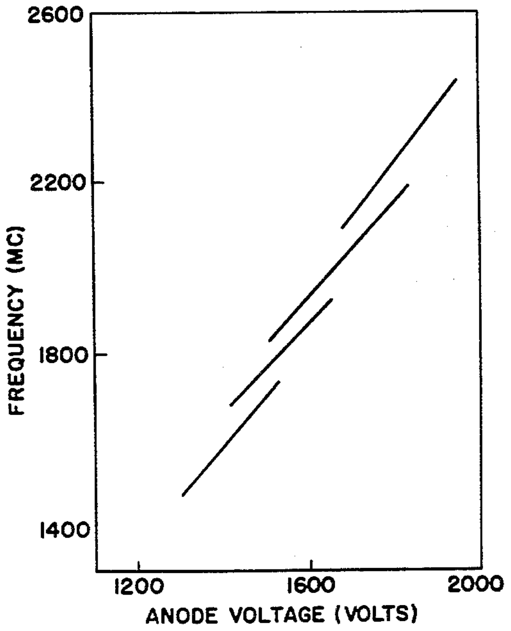
Figure 8 illustrates the voltage tuning characteristics of the corresponding power spectra of Figure 7.

Figure 7 illustrates the power spectra of the narrow band circuit of Figure 6. The four curves correspond to four different arbitrarily selected mechanical settings of the adjustable inductance-varying element 36. These settings were selected for illustrative purposes only. The element 36 can be adjustably positioned in numerous other preset positions. The control electrode was set for maximum output power for the lowest frequency curve (1600 mc.) and was set to limit the anode dissipation to a reasonable value for the other three curves. The output power can be decreased continuously to well below a watt by decreasing the control electrode voltage. The efficiencies, N, noted at the peaks of each curve in Figure 7 are for the center frequencies of the curves. Illustrated in Figure 8 are curves indicating the anode voltage tuning characteristics of the corresponding power spectra of Figure 7. Thus, with the circuit of Figure 6 it is possible selectively to set the circuit for resonancy at a predetermined desired center frequency over approximately a 2 to 1 range and then voltage tune the circuit linearly on either side of the desired center frequency.

Figure 9:
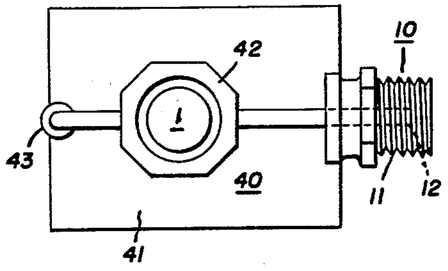
Figure 9 illustrates another embodiment of my circuit arrangement.

In some applications it is desirable to have lower impedance at the tube than is readily available through the use of the above-described circuits. In such cases the circuit of Figures 1 and 2 can be modified to assume the structure of the circuit 40 in Figure 9. Structurally, the circuit 40 includes lower and upper spaced parallel elements 41 and 42, respectively. Electrically the circuit 40 comprises a pair of transitional regions which can be the same as the one illustrated in Figures 1 and 2 and described above. The transitional regions are disposed on opposite sides of the magnetron 1. One transitional region is adapted for going to the useful load or output through a coaxial line terminal 10 and the other to a dummy load, such as a high value resistor 43. While this circuit may not be adapted for making maximum use of power output, it is well adapted for providing isolation between the tube and the useful load as well as a desirable impedance transformation.

Thus, it will be seen that I have provided line-over-ground plane voltage tunable magnetron circuits which are tunable over approximately a two-to-one range and are readily adapted for very wide band operation since there is substantially no low frequency limit to the operation thereof other than the low frequency limit of the tube used. My disclosed circuits can be made very small and thin which particularly adapts them for utilization with voltage tunable magnetrons which are small and include very closely spaced anode contact rings to which contact must be made by the conductive elements of the circuit. Additionally, the line-over-ground-plane construction of my circuits makes them simple to manufacture and enables the electrical characteristics thereof to be predetermined substantially accurately during the design stage. Still further, my circuits are adapted for both mechanical setting of resonance at predetermined center frequencies and voltage tuning, about such frequencies whereby voltage tunable magnetrons can be more flexibly operated. My circuits are also adapted for retaining and being the sole mechanical support for a magnetron operating therein and affords a degree of field continuity between a magnetron and a coaxial cable which minimizes undesirable reflections originating from the transforming position of the circuit.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. Means for coupling an interdigital magnetron including a pair of spaced anode rings to an output load comprising, a coaxial conductor including inner and outer elements, a unitary line-over-ground-plane transition structure for connection between said magnetron and coaxial conductor consisting of a pair of spaced parallel conductors, only one of said parallel conductors being connected to and extending longitudinally from an end of the outer element of said coaxial conductor and the other of said parallel conductors being connected to and extending longitudinally from the corresponding end of the inner element of said coaxial conductor, each of said parallel conductors having an opening between the ends thereof for receiving an end of said magnetron and making circumferential electrical contact with the outer surface of one of said anode rings thereby to hold said magnetron retained in said structure, and said parallel conductors being conductively disconnected in a transition region disposed between said apertures and said coaxial conductor.

2. Means for coupling an interdigital magnetron including a pair of spaced anode rings to an output load comprising, a coaxial conductor including inner and outer elements, a unitary line-over-ground-plane transition structure for connection between said magnetron and coaxial conductor including only a pair of elongated conductors secured together in spaced parallel relation, only one of said conductors being connected to the outer element of said coaxial conductor and only the other to the inner element of said coaxial conductor, and each of said conductors being apertured between the ends thereof for receiving an end of said magnetron and making circumferential electrical contact with the outer surface of one of said anode rings thereby to hold said magnetron securely retained between said parallel conductors; inductance means between said conductors on only the side of the apertures therein opposite said coaxial conductor and said inductance means being the only conductive connection between said spaced parallel conductors.

3. Means for transforming the output waves from an interdigital magnetron including a pair of spaced anode rings to an output load comprising, a coaxial conductor including inner and outer elements, a unitary line-over-ground-plane transition structure between said magnetron and coaxial conductor including only a pair of discrete elongated planar conductive elements secured together in spaced parallel relation, one of said planar conductive elements being connected to only the outer element of said coaxial conductor and the other to only the inner element of said coaxial conductor, each of said planar elements being apertured between the ends thereof for receiving an end of said magnetron and making circumferential electrical contact with the outer surface of one of said anode rings thereby to hold said magnetron securely retained between said planar elements; said planar elements each extending beyond the apertured portions thereof on the side opposite said coaxial conductor to provide an inductance region, and a conductive element adjustably positionable between the portions of said planar elements in said inductance region for selectively varying the inductance between said anode rings, thereby to effect resonance at predetermined desired operating frequencies.

4. Means for transforming the output waves from an interdigital magnetron including a pair of spaced anode rings to an output load comprising, a coaxial conductor including a tubular outer conductor and a central conductor, a unitary line-over-ground-plane transition structure between said magnetron and coaxial conductor inincluding only a pair of discrete elongated planar conductive elements secured together in spaced parallel relation, one of said planar elements being fixedly electrically connected to an end portion of only said outer conductor and the other of said planar elements including a tapered end portion diminishing in size toward said central conductor of said coaxial conductor and similarly connected thereto, and each of said planar elements being apertured between the ends thereof for receiving an end of said magnetron and making circumferential electrical contact with one of said anode rings, whereby said magnetron is supported and retained rigidly between said planar conductive elements.

5. Means for transforming the output waves from an interdigital magnetron including a pair of spaced anode rings to an output load comprising, a coaxial conductor including an outer conductor and a central conductor and having a predetermined characteristic impedance, a unitary line-over-ground-plane transition between said magnetron and coaxial conductor including only a pair of elongated planar conductors secured together in spaced parallel relation and each apertured and counterbored between the ends thereof for receiving and being electrically connected to one of said anode rings, one of said planar conductors being electrically connected only to said outer conductor and the other of said planar conductors being electrically connected only to said central conductor, the region of said transition between said magnetron and coaxial conductor being approximately a quarter wave length of the center frequency of a predetermined desired operating frequency band, and said transition having a characteristic impedance greater than said characteristic impedance of said coaxial conductor.

6. Means for transforming the output waves from an interdigital magnetron including a pair of spaced anode rings to an output load comprising, a coaxial conductor including a tubular outer conductor and a central conductor, a unitary line-over-ground-plane transition structure between said magnetron and coaxial conductor including a pair of elongated planar conductors secured together in spaced parallel relation, one of said planar conductors being fixedly electrically connected to an end portion of said outer conductor and the other of said planar conductors including a pair of oppositely extending tapered end portions, one of said tapered end portions of said other planar conductor being electrically connected to said central conductor of said coaxial line and the other of said tapered end portions being connected through high resistance means to the first-mentioned planar conductor, and each of said planar conductors being apertured between the ends thereof for receiving an end of said magnetron and making circumferential electrical contact with one of said anode rings.

7. A broad band circuit for transforming the output waves from an interdigital magnetron including a pair of spaced anode rings to an output load comprising, a coaxial conductor including inner and outer conductors and having a predetermined characteristic impedance, a unitary line-over-ground-plane transition structure between said magnetron and coaxial conductor having a characteristic impedance substantially the same as said coaxial conductor and including only a pair of elongated planar conductors secured together in spaced parallel relation, each of said planar conductors being apertured between the ends thereof for receiving an end of said magnetron and making circumferential electrical contact with the outer surface of one of said anode rings thereby to hold said magnetron securely retained and supported in said structure, one of said planar conductors having an end fixedly electrically connected to an end of said outer conductor, the other of said planar conductors including a tapered end portion fixedly electrically connected to said inner conductor, and an inductance stub adjustably positionable between the end portions of said planar conductors opposite said coaxial conductor for varying the inductance between said anode rings thereby selectively to resonate said circuit at predetermined desired frequencies.

References Cited in the file of this patent

UNITED STATES PATENTS

| | | |
|---|---|---|
| 2,639,405 | Benedict | May 19, 1953 |
| 2,721,309 | Seidel | Oct. 18, 1955 |
| 2,749,524 | De Rosa et al. | June 5, 1956 |
| 2,759,122 | Jenny | Aug. 14, 1956 |
| 2,794,144 | White | May 28, 1957 |
| 2,794,145 | Bryant | May 28, 1957 |
| 2,810,096 | Peters et al. | Oct. 15, 1957 |
| 2,817,719 | Decker | Dec. 24, 1957 |
| 2,825,875 | Arditi | Mar. 4, 1958 |